May 15, 1923.
C. FINNELL
LUBRICATING SYSTEM
Filed Dec. 19, 1921
1,455,244
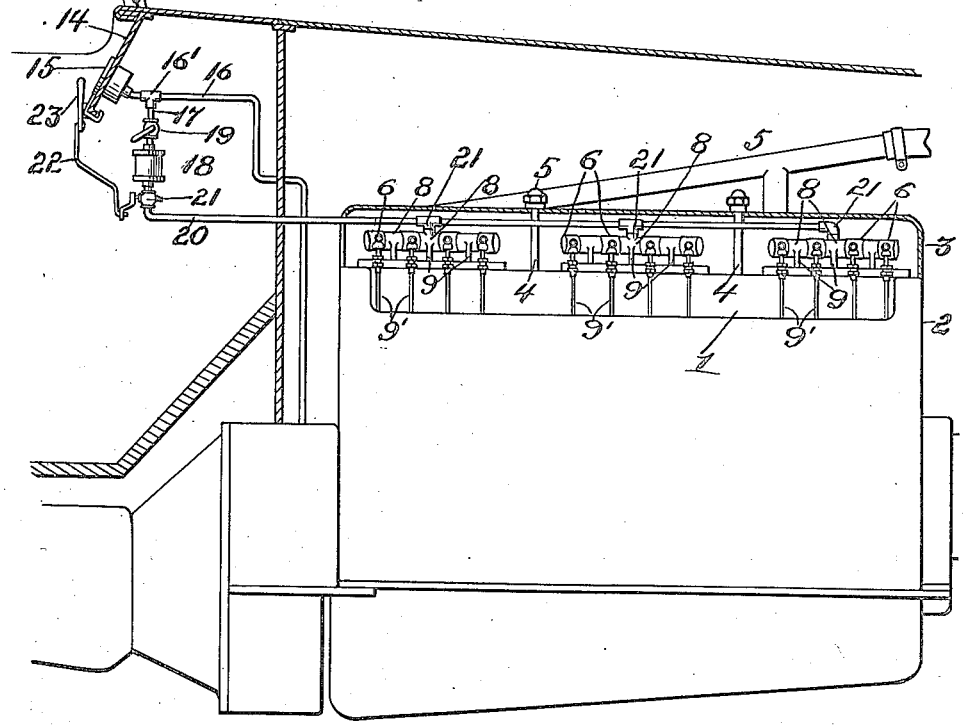
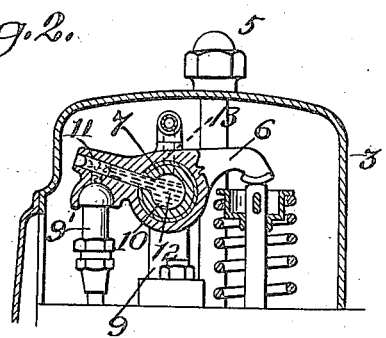
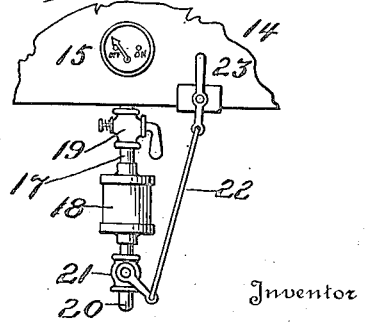
Inventor
Charlie Finnell
By Connolly Bros.
Attorneys Patented May 15, 1923.

1,455,244

UNITED STATES PATENT OFFICE.

CHARLIE FINNELL, OF ALEXANDRIA, VIRGINIA.

LUBRICATING SYSTEM.

Application filed December 19, 1921. Serial No. 523,544.

*To all whom it may concern:*

Be it known that I, CHARLIE FINNELL, citizen of the United States, residing at Alexandria, in the county of Arlington and State of Virginia, have invented certain new and useful Improvements in Lubricating Systems, of which the following is a specification, reference being had therein to the accompanying drawing.
This invention has relation to lubricating systems and particularly to lubricating systems for automobile engines of that class in which the valves are located in the heads of the cylinders and operated by rocker arms and push rods, such for instance, as the engines of the Buick automobile.

In engines of the character above referred to the rocker arms, the journals thereof and the upper ends of the push rods are enclosed within a casing having a removable cover and in order to oil the same it is necessary to stop the automobile, raise the hood, unscrew the nuts that hold the cover of the casing in position, lift the cover and remove it and then pour the required quantity of oil into oil cups located on and communicating with the rocker arm bearings.

As the above described operations must be repeated at comparatively frequent intervals in order to keep the rocker arms and the ends of the push rods properly lubricated and as the operation requires considerable time and involves considerable trouble and work and is very liable to result in soiled hands and clothing, it is often neglected until such time as attention is called to the fact that the oil is completely exhausted by the squeaking noise that ensues under such condition, which necessarily indicates undue and harmful friction that could have been avoided by supplying oil at the proper time.

The object of this invention is to provide novel means whereby the rocker arms and push rods and other appurtenant parts of an automobile engine of the character above referred to may be easily, speedily and adequately supplied with a definite measured charge of lubricating material, such as oil of the proper character, at any time and as often as may be desired or deemed necessary, without stopping the automobile and without any other effort than merely turning a small handle conveniently located on the instrument board.

In carrying my invention into effect I provide a conduit located in proximity to the engine and connected to the pipe that extends from the oil pump to the oil gauge on the instrument board, this conduit leading into the casing that encloses the rocker arms and having branches leading to the several oiling points of the rocker arms and being provided at a suitable point with a transparent oil cup and with suitable means for controlling the flow of oil, such means being so constructed and arranged as to be within reach of the driver whereby the latter, without leaving his seat or stopping the engine, can cause the oil in the oil cup to flow into the bearings of the rocker arms, thereby speedily and perfectly providing for the required lubrication of the same.

In the accompanying drawings in which I have illustrated my invention:

Fig. 1, is an elevation, partly in section, of the front portion of an automobile and the engine thereof, with my improvements applied.

Fig. 2, is a fragmentary transverse sectional view on an enlarged scale of a portion of the engine shown in Fig. 1.

Fig. 3, is a detail view in elevation of a portion of the lubricating devices.

The engine, designated 1, is of that type which has valves in the head of the cylinder, operated by rocker arms, through the medium of vertically disposed push rods; the stems of the valves, the springs thereof, the rocker arms and the upper ends of the push rods being enclosed within a casing 2, having a removable cover 3, supported on standards 4, having screw threaded upper ends that extend through holes in the cover 3 and carry nuts 5 that hold the cover in place.

Within the casing 2 are arranged the rocker arms 6, two to each cylinder, these rocker arms being pivotally mounted on hollow shafts 7, that are seated in bearings 8 which are supported by standards 9 extending upwardly from the cylinder heads of the engine. The rocker arms 6 have cups or concavities on their outer ends into which are fitted the semispherical upper ends of the push rods 9′ and the inner ends of the rocker arms bear on the upper ends of the engine valves.

The bores of the hollow rocker arm shafts, designated 10, communicate with passages 11 in the rocker arms, and the bores of the shafts and the passages in the rocker arms are filled with absorbent material 12, which carries oil, which is supplied to the bores of the shafts 7 by ports 13, to the ends of the rocker arms, where it serves to lubricate the cups in the rocker arms and the ends of the push rods.

The rocker arms are arranged in groups of four, one group to each pair of cylinders and as each group of rocker arms is mounted on a separate hollow shaft, but one oil port 13, for each group of rocker shafts is required, such port extending as shown through the central bearing 8 of each group.

Upon the instrument board, 14, of the automobile is arranged an oil gauge 15 of the usual character which is connected by a pipe 16 with an oil pump located in the base of the engine, which oil pump is of the usual character and need not, therefore, be described or shown.

So much of the engine and appurtenant parts and the oil gauge and connections as have been specifically described, are old and well known and conform in all particulars to the corresponding parts of the Buick automobile and I will now specifically describe my improvements as applied thereto.

An oil pipe 17 is connected to the pipe 15 by a T joint 16' and the oil pipe 17 leads to and is connected with a transparent oil cup 18, the pipe 17, being provided with a stop cock 19.

A pipe 20 leads from the lower end of the oil cup 18 to and into the casing 2 and is in constant communication through suitable connections and branch pipes 21 with each of the ports 13 of the rocker arm bearings 8.

A stop cock 21 is arranged on the pipe 20 below the oil cup 18 and the stem of this stop cock is connected by a rod 22 to a handle or lever 23 on the instrument board 14.

Operation.

The lubricating oil normally fills the pipe 15 and the stop cock 19 being open and the stop cock 21 being closed, the oil also flows into and fills the pipe 17 and the oil cup 18.

When it is desired to supply a charge of oil to the rocker arms and their bearings, it is only necessary to turn the lever 23, thereby opening the stop cock 21 and permitting the oil from the oil cup and the pipe above the same to flow through the pipe 20 and its several branches into the bores of the rocker arms shafts, thus providing a full measured charge therefor.

If the above operation is performed while the engine is running it is advisable to close the stop cock 19 while the stop cock 21 is open and then open the stop cock 19 after the stop cock 21 is closed, whereas if the engine is not running the stop cock 19 can be left open, so that when the engine starts the oil cup 18 will be filled by the operation of the oil pump.

I claim:

1. In a lubricating system, the combination with an automobile having an engine with valve operating means located above the cylinders thereof and an oil pipe extending to a point higher than said valve operating means, of a conduit leading from said oil pipe to the valve operating means and comprising an oil cup, connection pipes and a manually operable stop cock located between the oil cup and the engine and so disposed as to be operable from the seat of the automobile.

2. In a lubricating system, the combination with an automobile having an instrument board, an engine with valve operating means disposed above the cylinders and having an oil pipe leading to the instrument board, of a conduit comprising an oil cup, oil carrying connections between the said oil cup and the valve operating means, a stop cock located on said conduit between said oil cup and valve operating means and manually operable means carried by the instrument board for operating the stop cock.

In testimony whereof I have affixed my signature.

CHARLIE FINNELL.